Oct. 23, 1962 R. J. THORPE ETAL 3,059,427
APPARATUS FOR CONTROLLING THE FUEL SUPPLY TO AN
INTERNAL COMBUSTION ENGINE DURING STARTING
Filed Oct. 15, 1956

INVENTORS
ROBERT J. THORPE,
MYRLE C. ELEY

BY
AGENT 3,059,427
APPARATUS FOR CONTROLLING THE FUEL SUPPLY TO AN INTERNAL COMBUSTION ENGINE DURING STARTING
Robert J. Thorpe, Shawnee, Kans., and Myrle C. Eley, Rockford, Ill., assignors, by mesne assignments, to the United States of America as represented by the Secretary of the Air Force
Filed Oct. 15, 1956, Ser. No. 616,068
6 Claims. (Cl. 60—39.14)

This invention relates to fuel supply apparatus for an internal combustion engine, more particularly to apparatus for controlling the fuel supply to such an engine during starting, and has for an object to provide simple yet reliable apparatus of the above type.

It is another object of the invention to provide an improved yet highly simplified structure for adequately controlling the fuel supply to an aviation gas turbine engine during starting at any altitude within its operational range.

It is a further object to provide a fuel control structure of the above type wherein the fuel supply to the engine is limited, in accordance with an operational schedule, by a metering valve which is movable from a minimum open position to a maximum open position, in accordance with a predetermined time cycle.

Yet a further object is to provide a fuel control structure of the above type having a timer-controlled metering valve which is effective to limit the fuel supply to an aviation gas turbine engine during the starting period only, during which period the governor is ineffective to safely limit the fuel supply.

Still another object is to provide a starting fuel control structure of the above type which is applicable to a missile powered by an aviation gas turbine engine and which may be remotely controlled.

Gas turbine engine powered missiles, for example, missiles adapted to be launched from a mother aircraft, are carried aloft and then started and launched. Such missiles may be started and launched at any altitude within their operational limits in accordance with the specific type of intended mission. In view of the short life expectancy of such missiles and in the interest of weight reduction, it is desirable to provide the least complex controls for adequately controlling these missiles. Hence, to avoid undue complexity, the engine speed governor employed is of simple type, typically containing no acceleration control mechanism and arranged to maintain the engine at a set operational speed. A governor of this type, however, is inadequate to properly control the fuel supply to the engine during starting at any except low altitudes.

In view of the above, if the speed governor is designed to properly control the starting fuel supply to the engine at low altitudes such as sea level, for example, at higher altitudes it would permit an excess of fuel to flow to the engine during a starting period, thereby causing over-heating of the engine and/or surging of the compressor.

In accordance with the invention, in a fuel supply system for an aviation gas turbine engine having a constant or set speed governor for controlling fuel flow to the engine during starting at a low altitude and thereafter regulating the fuel flow to maintain the speed of the engine at a fixed value, a metering valve is interposed between the governor and the engine. The metering valve is movable from a minimum open position to a maximum open position at a constant slow rate by an electric motor during the engine starting cycle. Hence, although the rotational speed of the engine is below the speed for which the governor is set, so that the governor passes the maximum rate of fuel in an attempt to accelerate the engine to the set speed, the flow to the engine is controlled in gradually increasing quantities by the metering valve for a sufficient time interval to insure that the engine is safely brought up to operational speed. In the minimum open position, the valve passes sufficient fuel flow to permit light-off or initial ignition at maximum operational altitude of the engine, while in the maximum open position fuel flow is unrestricted, so that fuel flow is thereafter controlled by the governor.

Means including a differential pressure throttling valve is also interposed between the governor and the timer actuated metering valve to provide a constant pressure drop across the latter.

The above and other objects are effected by the invention as will be apparent from the following description taken in connection with the accompanying drawings, forming a part of this application, in which.

Figure 1:
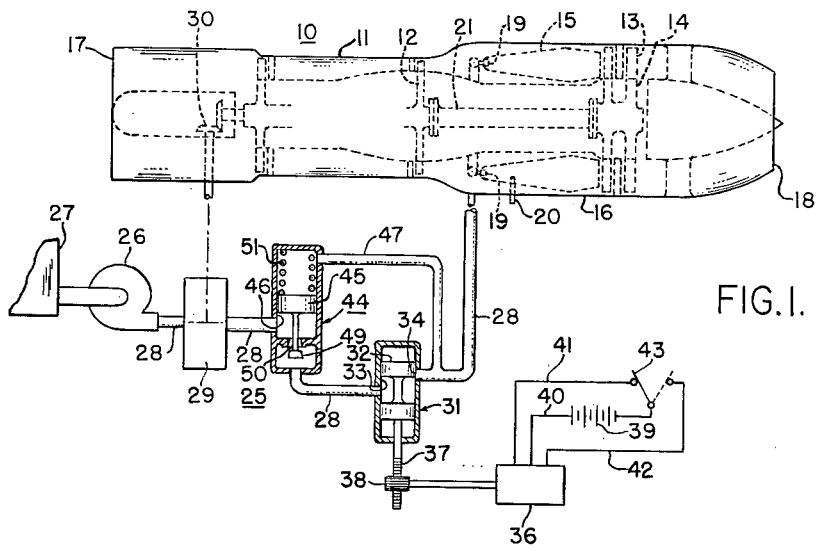
FIG. 1 is a schematic view illustrating an engine fuel supply system incorporating the invention.

Referring to the drawing in detail, in FIG. 1 there is shown a conventional aviation turbojet engine 10 for powering a guided missile or other suitable aircraft (not shown) having the usual operating components comprising a compressor section 11 including a bladed rotor 12, a turbine 13 including a bladed rotor 14 and a fuel combustion chamber 15 interposed between the compressor and the turbine for providing hot motive gases to the latter. The above components are disposed in coaxial alignment within an outer casing 16 open at both ends and providing an air inlet 17 and exhaust outlet 18, as well known in the art. Also, fuel is supplied to the combustion chamber 15, in a manner hereinafter described, by a plurality of fuel injection nozzles 19, and ignited by an ignitor 20. In operation, the motive gases from the fuel combustion chamber 15 motivate the turbine rotor 14 which in turn drives the compressor rotor 12 through a connecting shaft 21. The partially spent motive gases are then ejected through the exhaust outlet 18 to impart a propulsive thrust to the engine.

As known in the art, aviation engines including turbojet engines of the type described above require less fuel for "light-off" or initial ignition at high elevations than at low elevations. This is also true of the fuel required to accelerate the engine to a preselected speed. Hence, if excessive fuel is supplied to the engine during the light-off and/or the initial acceleration period, the engine may be seriously overheated and the attendant excessive acceleration may cause the compressor to surge. The period including light-off and subsequent acceleration to preselected or operational speed will hereinafter be referred to as the starting period.

In accordance with the invention a fuel control system, generally designated 25, is provided for supplying liquid fuel to the turbojet engine 10. The fuel control system includes a fuel pump 26, which may be of the centrifugal type, for delivering pressurized fuel from a fuel source such as a tank 27 to the fuel injection nozzles 19 by means of a fuel delivery conduit 28.

In the fuel conduit 28 downstream of the fuel pump 26, there is interposed a governor 29 for maintaining the speed of the engine at a constant predetermined value. Details of the governor 29 have not been shown. However, as well known in the art, it is driven by the engine shaft 21 through suitable gearing 30 and regulates fuel flow through the supply conduit 28 to the fuel injection nozzles 19. During underspeed conditions, such as incurred during a starting period, fuel is delivered at a maximum rate until the engine attains the set speed, whereupon the fuel flow rate is regulated to maintain the set speed. Governors of this type (often termed set-speed governors or constant speed governors), are relatively simple in structure and operation and relatively inexpensive to manufacture, so that it is highly desirable to employ them in guided missile applications, especially in cases where the engine is started at sea level or similarly low elevation.

Figure 2:
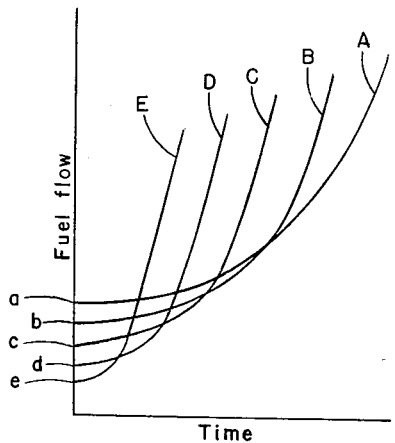
FIG. 2 is a chart plotting a plurality of curves illustrating optimum fuel flow schedules for an engine during starting at various operational altitudes.

In FIG. 2 there is illustrated a chart plotting fuel flow in gallons per hour as ordinates against time in seconds as abscissa. A family of curves A, B, C, D and E is shown therein representing starting fuel flow requirements for the engine 10 at increasing altitudes, for example, sea level, 5,000 feet, 10,000 feet, 15,000 feet and 20,000 feet, respectively.

The origins $a$, $b$, $c$, $d$ and $e$ of the curves A, B, C, D and E, respectively, indicate graphically the fuel requirements of the engine for light-off at the corresponding above-mentioned altitudes. It will be noted that the light-off fuel requirement $a$ (sea level) is considerably higher than the light-off fuel requirement $b$ (5,000 feet elevation); the light-off fuel requirement $b$ is considerably higher than the light-off fuel requirement $c$ (10,000 feet elevation); etc. Hence, the fuel required for light-off decreases with altitude.

However, since the governor 29 is of the simple set-speed type mentioned, it has no provision for regulating fuel during the starting period and provides maximum fuel flow to the engine as long as the underspeed condition incident to a starting period prevails.

Figure 3:
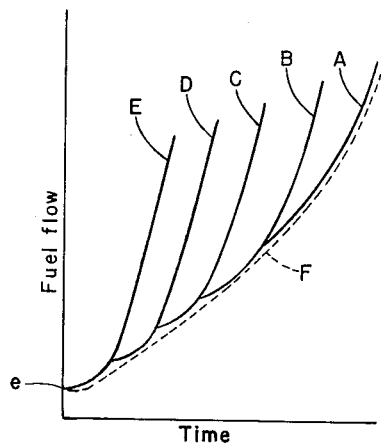
FIG. 3 is a chart similar to that shown in FIG. 2 but further having an envelope curve illustrating the starting schedule attained with the invention.

Provision is accordingly made in the fuel control system for controlling rate of fuel flow to the engine during a starting period at any elevation within the operating range of the engine. As illustrated in the chart shown in FIG. 3 which is similar to the chart shown in FIG. 2, except that only the origin $e$ of curve E is shown and the other curves A–D inclusive have been placed end to end, an envelope curve F (shown in dotted lines) is attained which provides a fuel flow schedule satisfying light-off and acceleration requirements to operating speed for any elevation from sea level to 20,000 feet elevation.

A fuel metering valve 31, for controlling starting fuel flow to the engine fuel nozzles 19 in accordance with the envelope curve F, is interposed in the supply conduit 28 downstream of the governor 29. The metering valve may be of the type having a piston member 32 slidably received within a cylindrical bore 33 and movable across a metering port 34 to vary the open area thereof in a known manner. The piston member 32 is drivenly connected to a timer motor 36 in any desirable manner, for example, by a rack 37 connected to the piston 32 and in meshing engagement with a pinion 38 driven by the timer motor. The timer motor 36 is preferably of the reversible type and may be energized for rotation in either direction by a suitable electrical power source 39 connected thereto by a 3-wire circuit including a common return wire 40, wires 41 and 42, and a two pole double-throw reversing switch 43. The motor 36 may be controlled by suitable means (not shown) for limiting its rotational travel in forward and reverse direction in such a manner that when the reversing switch 43 is thrown to the left the metering valve 31 is moved at a uniform rate of speed from a minimum open position corresponding to origin $e$ to a fully open position. To reset the valve 31 to its minimum open position the switch 43 is thrown to the right, reversing the direction of rotation of the motor and causing it to return the valve to its minimum open position for a purpose which will subsequently be explained.

In order to provide a constant pressure drop across the metering valve port 34, a differential pressure throttle valve 44 is provided comprising a piston valve member 45 slidably received within a tubular bore 46. The tubular bore 46 is in communication at one end with the supply conduit 28 adjacent the discharge outlet of the governor and at the other end, by means of a bypass conduit 47, with the supply conduit 28 adjacent the discharge side of the metering valve port 34. The differential pressure valve 44 is also provided with an axial stem carrying a throttle valve member 49 which controls a port 50 in the supply conduit 28 between the governor 29 and the metering valve 31.

The differential pressure valve 44 is further provided with a spring 51 biasing the throttle valve member 49 toward the open position.

When it is desired to start the engine 10, the fuel pump 26 is energized by any suitable means (not shown) to deliver fuel under pressure from the tank 27 to the fuel injection nozzles 19. Concomitantly therewith, the reversing switch 43 is thrown to the left energizing the timer 36, whereupon the metering valve member 32 is slowly moved upwardly to gradually uncover the port 34. Since the engine is below operating speed, the governor offers no restriction to fuel flow from the pump. By means of conduit 28, this unrestricted fuel flow is directed through the differential throttle valve 44 to the timer actuated metering valve 31. At the initiation of the timed period the minimum open area of the port 34 will pass fuel at the rate indicated by the value $e$ (FIG. 3), thereby permitting immediate safe light-off of the engine at 20,000 feet. However, since the flow rate to the injection nozzles 19 follows the envelope curve F, as controlled by movement of the metering valve member 32, instead of the curve E, the engine acceleration is retarded somewhat before the set speed is attained. As the valve member 32 moves to the end of its travel, the open area of port 34 attains its maximum value. However, by this time the engine is up to set speed and the fuel flow is thenceforth controlled by the governor 29.

During metering operation of the valve 31, the fuel pressure in conduit 28 downstream of port 34 is transmitted through the bypass conduit 47 and added to the bias of spring 51, urging the differential pressure throttling valve 44 in opening direction. The total opening forces thus exerted on the valve 44 are opposed by the fuel pressure from the governor 29, thus positioning the throttling valve member 49, so that the pressure drop across its port is regulated in a manner to assure that a constant pressure drop is maintained across the metering valve port 34.

At the end of an engine operating period the metering valve is reset or returned to its original minimum opening position by throwing the reversing switch 43 to the right, thereby energizing the timer motor 36 in the reverse direction.

When the engine is started at a lower altitude, for example 5,000 feet, the sequence of operations is the same as described above in conjunction with the engine starting period at 20,000 feet. However, light-off is delayed until the metering valve 31 opens sufficiently to permit adequate fuel flow to the fuel injection nozzles to sustain combustion at 5,000 feet. This value is attained when the valve 31 opens sufficiently to pass the fuel quantity indicated at $b$ in FIG. 2. Here again the acceleration of the engine to the operating speed is delayed somewhat, since the fuel flow rate to the engine is controlled in accordance with the envelope curve F of FIG. 3 instead of the curve B.

It will thus be seen that the fuel control system described provides a simple and uncomplicated arrangement for controlling fuel flow to an engine during a starting period, regardless of the altitude at which the engine is started.

It will further be seen that with the described control system fuel flow to an engine may be controlled in accordance with a predetermined schedule during a starting period wherein the set-speed governor is inadequate to properly control the fuel flow.

Although the exact shape of the metering port 34 is not critical, it is preferably non-circular and is contoured in any desirable manner to schedule fuel flow in accordance with the envelope curve F when the valve member 32 is driven at constant velocity.

By briefly referring to FIG. 2, it will be seen that the optimum starting fuel curves or schedules A, B, C, D and E graphically indicate that the engine may be accelerated to operating speed more rapidly with increase in altitude. Also, by referring to FIG. 3, it will be seen that the metering valve 31 schedules fuel flow in accordance with envelope curve F so that the acceleration rate during starting is constant for all altitudes. Hence, the starting period for any engine start above sea level is compromised somewhat. This compromise, however, is materially insignificant since between sea level starting and maximum altitude starting it may be on the order of thirty to sixty seconds.

While the invention has been shown in but one form, it will be obvious to those skilled in the art that it is not so limited, but is susceptible of various changes and modifications without departing from the spirit thereof.

What is claimed is:

1. In a fuel control system for an aviation internal combustion engine having a liquid fuel source, a fuel pump and a constant speed governor for controlling rate of fuel flow from said fuel pump in a manner to provide adequate fuel to the engine during a starting period at low altitude but excessive fuel during said starting period at a higher altitude; the combination therewith including a movable metering valve for controlling the fuel flow to the engine during said starting period, said metering valve interposed between said governor and said engine, said valve having a minimum open position for restricting the fuel flow to a value adequate for starting the engine at said high altitude and a maximum open position for permitting unrestricted flow, mechanism for moving said valve solely during said starting cycle from said minimum open position to said maximum open position in a predetermined time interval and a differential pressure throttling valve interposed between the governor and said metering valve to provide a constant pressure drop across said metering valve.

2. The structure recited in claim 1 and further including means for resetting the valve in its minimum open position prior to initiation of a subsequent starting period.

3. The structure recited in claim 1 in which the mechanism for moving the valve includes a reversible timer motor and means for selectively energizing said motor in forward direction to move the valve to the maximum open position and in reverse direction to reset the valve to the minimum open position.

4. In a fuel control system for an aviation gas turbine engine having a liquid fuel source, a fuel pump, a constant speed governor for controllng rate of fuel flow to said engine in a manner to maintain the engine speed constant and a main fuel delivery conduit connecting the outlet of said fuel pump to the inlet of said governor; the combination therewith of means for limiting the flow of fuel to the engine during a starting period including a metering valve interposed in said conduit between said governor and the engine, said metering valve being movable from a minimum open position permitting sufficient flow of fluid through said conduit to permit engine light-off at a high altitude to a maximum open position permitting unrestricted flow of fuel from said governor to the engine, a timer mechanism for moving said metering valve from the minimum to the maximum open position solely during said starting period at a uniform predetermined rate of travel and a differential pressure throttling valve interposed between said governor and said metering valve to provide a constant pressure drop across said metering valve.

5. The structure recited in claim 4 in which the metering valve is provided with a piston valve member and an outlet port, said piston member being movable across said port in opening direction to progressively unblock an increasing area of said port.

6. In a fuel control system for an aviation gas turbine engine having a liquid fuel source, a centrifugal fuel pump and a constant speed governor for controlling rate of fuel flow to said engine in a manner to maintain the engine speed constant; the combination therewith of means for limiting the flow of fuel to the engine during a starting cycle including a main fuel delivery conduit connected to said governor, a metering valve interposed in said main fuel conduit downstream of said governor, a timer mechanism for moving said metering valve from a minimum open position to a maximum open position at a predetermined rate of travel during a starting cycle, and means for maintaining a constant pressure drop across said metering valve, said means including a bypass fuel conduit interconnected with said main conduit on the downstream side of said metering valve and a differential pressure throttling valve interposed in said main conduit between said governor and said metering valve, said throttling valve having a spring-biased piston member responsive to pressure of fuel downstream of the governor on one side and pressure of fuel in said bypass conduit on the opposite side.

References Cited in the file of this patent

UNITED STATES PATENTS

| | | |
|---|---|---|
| 2,576,352 | Neal | Nov. 27, 1951 |
| 2,693,081 | Russ | Nov. 2, 1954 |
| 2,695,498 | Szydlowski | Nov. 30, 1954 |
| 2,705,047 | Williams et al. | Mar. 29, 1955 |
| 2,741,085 | Prentiss | Apr. 10, 1956 |
| 2,741,263 | Spencer | Apr. 10, 1956 |

FOREIGN PATENTS

| | | |
|---|---|---|
| 526,826 | Belgium | Mar. 15, 1954 |